US010845851B2

(12) United States Patent
Kosugi et al.

(10) Patent No.: US 10,845,851 B2
(45) Date of Patent: Nov. 24, 2020

(54) ELECTRONIC APPARATUS

(71) Applicant: LENOVO (SINGAPORE) PTE. LTD., Singapore (SG)

(72) Inventors: Kazuhiro Kosugi, Yokohama (JP); Takehito Yamauchi, Yokohama (JP); Masahiro Tokuno, Yokohama (JP); Takuo Yamagishi, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 18 days.

(21) Appl. No.: 16/409,715

(22) Filed: May 10, 2019

(65) Prior Publication Data

US 2020/0272208 A1 Aug. 27, 2020

(30) Foreign Application Priority Data

Feb. 27, 2019 (JP) .................................. 2019-034614

(51) Int. Cl.
*G01J 5/00* (2006.01)
*G06F 1/16* (2006.01)

(52) U.S. Cl.
CPC .......... *G06F 1/1686* (2013.01); *G06F 1/1656* (2013.01); *G06F 1/1616* (2013.01)

(58) Field of Classification Search
CPC .... G06F 1/1656; G06F 1/1686; G06F 1/1616; G06F 3/0304
See application file for complete search history.

(56) References Cited

U.S. PATENT DOCUMENTS

| 8,467,834 | B2* | 6/2013 | Lee ....................... G06F 1/1626 |
| | | | 455/566 |
| 10,466,749 | B1* | 11/2019 | Hendren ................ F16M 11/10 |
| 2014/0197305 | A1* | 7/2014 | Hsu .................... H01L 31/02325 |
| | | | 250/208.2 |
| 2014/0210707 | A1* | 7/2014 | Holz ...................... G06F 3/0304 |
| | | | 345/156 |
| 2015/0363003 | A1* | 12/2015 | Henriz ............... H04N 5/23229 |
| | | | 345/156 |
| 2016/0292633 | A1* | 10/2016 | Griffin ............... G06K 7/10861 |
| 2017/0160427 | A1* | 6/2017 | Costello ................... G01V 8/12 |
| 2018/0131880 | A1* | 5/2018 | Hicks .................. H01S 5/18386 |
| 2019/0034609 | A1* | 1/2019 | Yang ..................... G10L 17/005 |
| 2019/0041660 | A1* | 2/2019 | Ahmed ................ H04N 5/2354 |
| 2019/0196546 | A1* | 6/2019 | Wu ........................ H01L 23/552 |

FOREIGN PATENT DOCUMENTS

| JP | 08233947 A | * | 9/1996 |
| JP | 2003255922 A | | 9/2003 |

\* cited by examiner

*Primary Examiner* — Kiho Kim
(74) *Attorney, Agent, or Firm* — Shimokaji IP

(57) ABSTRACT

An electronic apparatus includes a base, an object detecting section, and a chassis that houses the base and the object detecting section. The object detecting section includes a substrate and a detecting element that is provided on a first principal surface of the substrate and is configured to detect a wave coming from an object and output a detection signal. The object detecting section is mounted on the base with the first principal surface facing the base. The base has a long passage hole that allows the wave to pass therethrough toward the detecting element. A longer direction of the passage hole is along a first direction that is a substantially horizontal direction when the chassis adopts a reference posture.

4 Claims, 6 Drawing Sheets

ELECTRONIC APPARATUS

FIELD OF THE INVENTION

The present invention relates to an electronic apparatus.

BACKGROUND OF THE INVENTION

Detecting user's presence is demanded of an electronic apparatus, such as a personal computer (PC) (for example, see Patent Document 1).

[Patent Document 1] Japanese Unexamined Patent Application Publication No. 2003-255922

SUMMARY OF THE INVENTION

Depending on a user's position, it is sometimes not easy for the electronic apparatus to accurately detect the user.

The present invention has been made in view of such circumstances, and is intended to provide an electronic apparatus capable of accurately detecting a user.

An electronic apparatus according to an aspect of the present invention includes a base, an object detecting section, and a chassis that houses the base and the object detecting section. The object detecting section includes a substrate and a detecting element that is provided on a first principal surface of the substrate and is configured to detect a wave coming from an object and output a detection signal. The object detecting section is mounted on the base with the first principal surface facing the base. The base has a long passage hole that allows the wave to pass therethrough toward the detecting element. A longer direction of the passage hole is along a first direction that is a substantially horizontal direction when the chassis adopts a reference posture.

The above-described aspect of the present invention can detect a user accurately.

DETAILED DESCRIPTION OF THE INVENTION

[Electronic Apparatus]

An electronic apparatus according to an embodiment is described.

Figure 1:
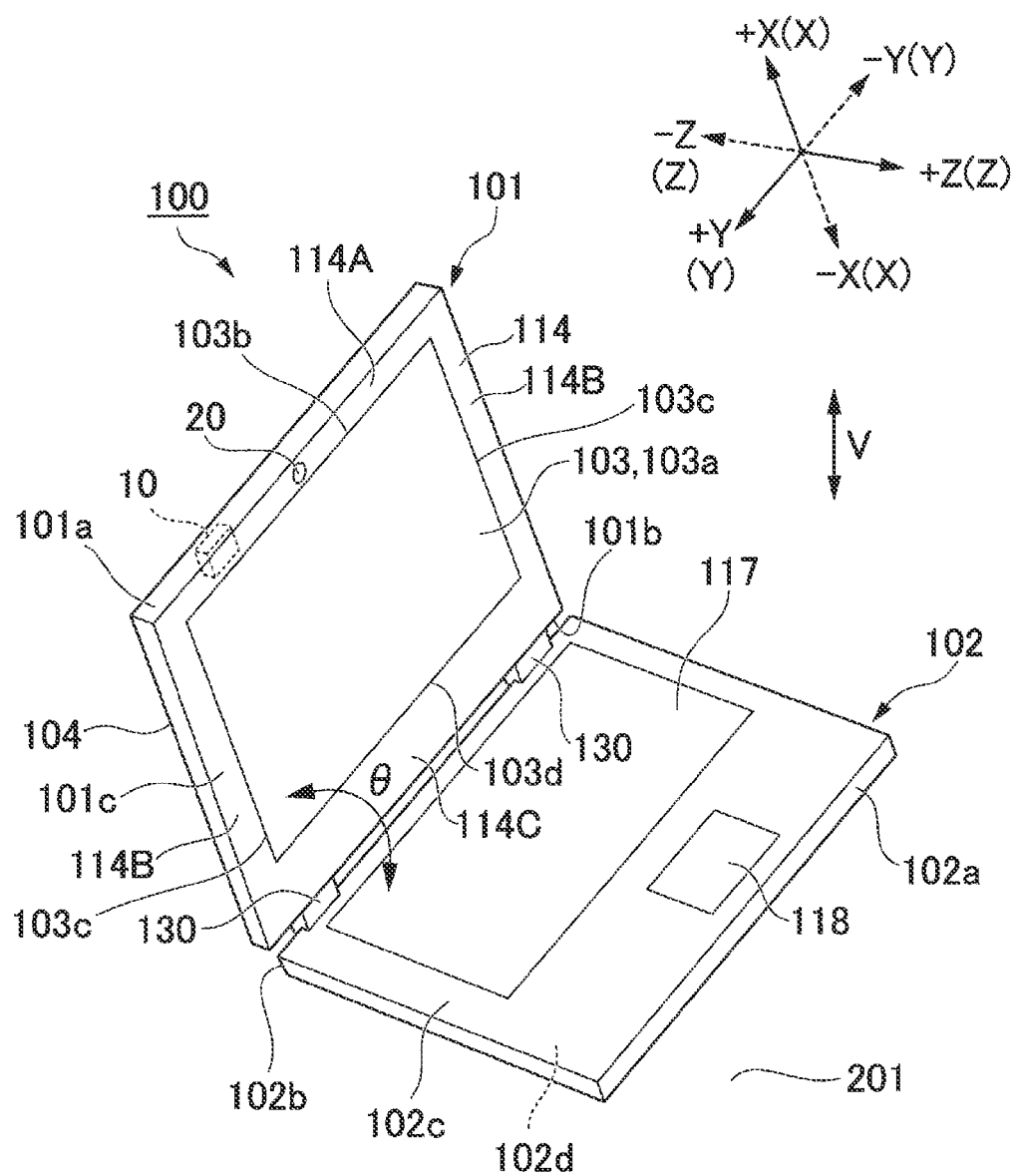
FIG. 1 is a perspective view of an electronic apparatus according to an embodiment.
Figure 2:
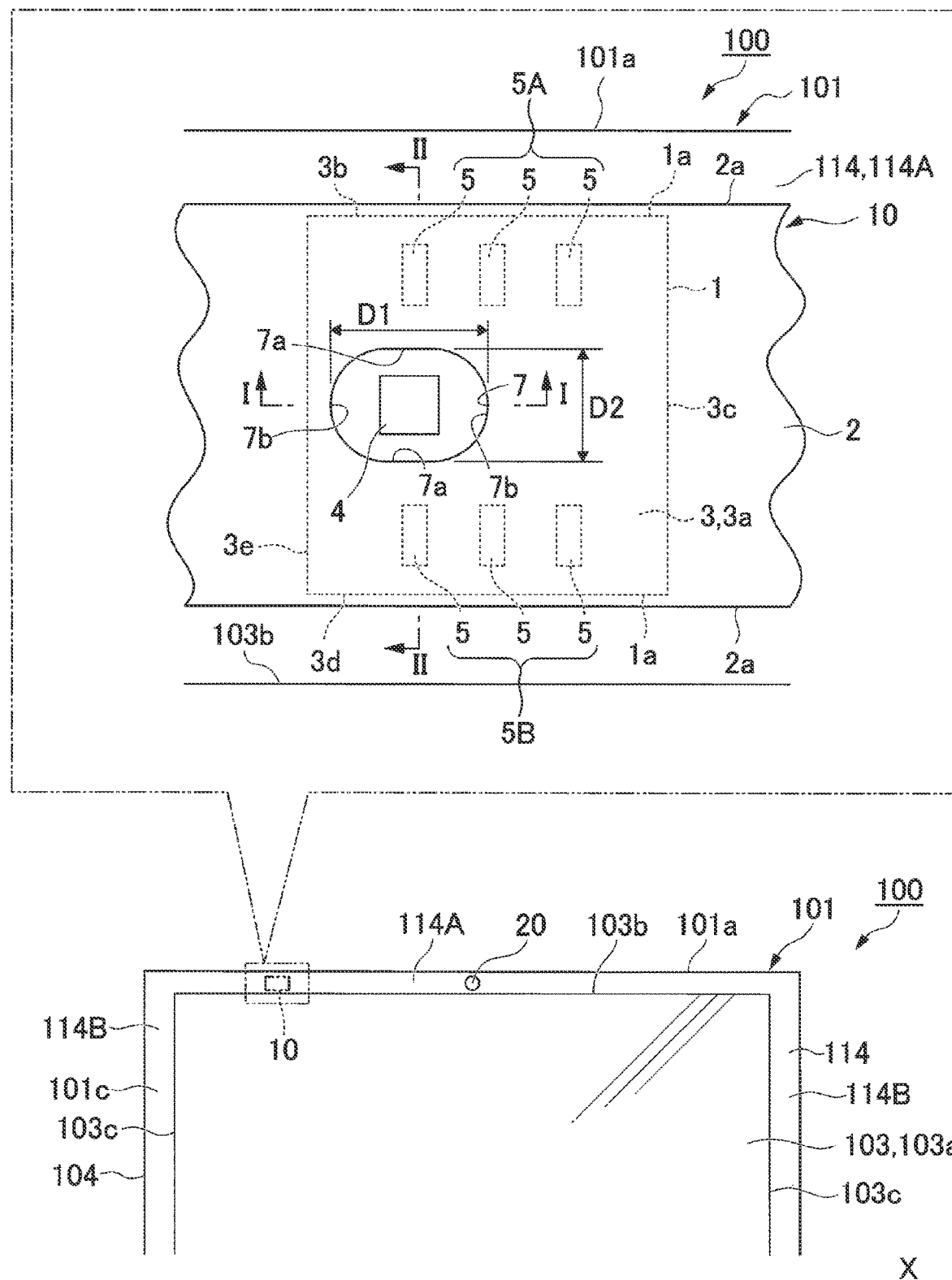
FIG. 2 is a front view of a portion of the electronic apparatus according to the embodiment.

FIG. 1 is a perspective view of an electronic apparatus 100 according to the present embodiment. FIG. 2 is a front view of a portion of the electronic apparatus 100. FIG. 2 is a diagram of a portion of a first chassis 101 viewed from a Z direction.

For example, the electronic apparatus 100 is a laptop PC as shown in FIG. 1. PC stands for a personal computer.

The electronic apparatus 100 includes the first chassis 101, a second chassis 102, a pair of hinge mechanisms 130, an object detecting unit 10, and an imaging unit 20. Respective ends of the first and second chassis 101 and 102 are connected with each other through the hinge mechanisms 130. The first chassis 101 is rotatable about the axis of rotation formed by the hinge mechanisms 130 relative to the second chassis 102. The direction of a rotating shaft of each hinge mechanism 130 is parallel to respective proximal ends 101b and 102b of the first and second chassis 101 and 102. The pair of hinge mechanisms 130, 130 is provided such that the hinge mechanisms 130, 130 are spaced apart from each other in right and left.

The first chassis 101 is also referred to as an A cover or a display chassis. The second chassis 102 is also referred to as a C cover or a system chassis. The first chassis 101 and the second chassis 102 are formed into a rectangular plate. Of all ends of the first and second chassis 101 and 102, respective ends provided with the hinge mechanisms 130 are referred to as the first proximal end 101b and the second proximal end 102b. The first proximal end 101b and the second proximal end 102b are parallel to each other. Respective ends on the side opposite to the first proximal end 101b and the second proximal end 102b are referred to as a first open end 101a and a second open end 102a.

In the first chassis 101, a direction from the first open end 101a to the first proximal end 101b is referred to as a "rear direction". A direction opposite to the rear direction is referred to as a "front direction". The front direction and the rear direction are collectively referred to as a "front-rear direction". The front-rear direction is a direction of connecting the first proximal end 101b and the first open end 101a. Leftward and rightward directions in FIG. 2 are referred to as a "left direction" and a "right direction", respectively. The left direction and the right direction are collectively referred to as a "right-left direction".

As for the first chassis 101, as shown in FIG. 1, a Positional relationship of its components may be described with an XYZ Cartesian coordinate system. The X direction (a second direction) is the front-rear direction. The +X direction is the front direction. The -X direction is the rear direction. The Y direction is an in-plane direction of the first chassis 101, and is the right-left direction (a first direction) perpendicular to the X direction. The +Y direction is the left direction. The -Y direction is the right direction. The first proximal end 101b and the second proximal end 102b extend in the Y direction. The Z direction is a thickness direction of the first chassis 101, and is a direction perpendicular to the X direction and the Y direction. The +Z direction is an inward direction. The -Z direction is an outward direction.

The first chassis 101 includes a display 103 and a chassis main body 104. The display 103 is, for example, a liquid crystal display, an organic electro-luminescence (EL) display, or the like. The chassis main body 104 is loaded with the display 103. The chassis main body 104 includes a bezel 114. The bezel 114 is formed into a rectangular frame surrounding a display area 103a of the display 103, when viewed from a direction parallel to the Z direction. The bezel 114 includes a front bezel 114A, a pair of side bezels 114B, 114B, and a rear bezel 114C.

The front bezel 114A extends in the right-left direction (the Y direction) along a front end 103b of the display area 103a. The side bezels 114B, 114B extend in the front-rear direction (the X direction) along side ends 103c, 103c of the display area 103a. The rear bezel 114C extends in the right-left direction (the Y direction) along a rear end 103d of the display area 103a.

The second chassis 102 is loaded with a keyboard 117 and a touchpad 118. The keyboard 117 and the touchpad 118 are an input device. A pointing device (not shown) and a mouse (not shown) may as well be provided as an input device.

FIG. 1 shows a state where the first chassis 101 is open to the second chassis 102 (hereinafter, it may be referred to simply as an "open state"). In the open state, the first open end 101a is separated from the second open end 102a. In the open state, an inner surface 101c of the first chassis 101 and an inner surface 102c of the second chassis 102 are exposed. A surface of the second chassis 102 opposite to the inner surface 102c is referred to as an outer surface 102d.

In the state where the first chassis 101 is open to the second chassis 102, an angle (an open angle) θ between the inner surface 101c of the first chassis 101 and the inner surface 102c of the second chassis 102 satisfies, for example, "0°<θ<360°". The open angle θ may as well satisfy "0°<θ<190°". The open angle θ may be 70° to 140°. The open angle θ is preferably 100° to 130°.

In FIG. 1, the electronic apparatus 100 is placed on an installation surface 201 that is a horizontal plane with the outer surface 102d of the second chassis 102 facing down. As the outer surface 102d of the second chassis 102 is in contact with the installation surface 201, the second chassis 102 adopts a horizontal posture. A posture of the first chassis 101 when the second chassis 102 adopts the horizontal posture is referred to as a "reference posture". The reference posture is generally a posture of the electronic apparatus 100 when in use. When the first chassis 101 adopts the reference posture, the second chassis 102 adopts the horizontal posture, and thus the second proximal end 102b is along a horizontal direction. The first proximal end 101b is parallel to the second proximal end 102b, and thus is along the horizontal direction. Therefore, the Y direction (the first direction) is a direction along the horizontal direction.

A thickness direction of the second chassis 102 is a direction perpendicular to the installation surface 201, and thus coincides with a vertical direction V. Therefore, the Y direction (the first direction) along the horizontal direction is a direction intersecting with the vertical direction V, and, specifically, is a direction perpendicular to the vertical direction V.

As shown in FIG. 2, the object detecting unit 10 is provided inside the first chassis 101 and in a position on the side of the first open end 101a against the display area 103a of the display 103. Specifically, the object detecting unit 10 is provided between the front end 103b of the display area 103a of the display 103 and the first open end 101a when viewed from a direction parallel to the Z direction. That is, the object detecting unit 10 is provided in a position corresponding to the front bezel 114A. The object detecting unit 10 is housed in the first chassis 101.

Figure 3A:
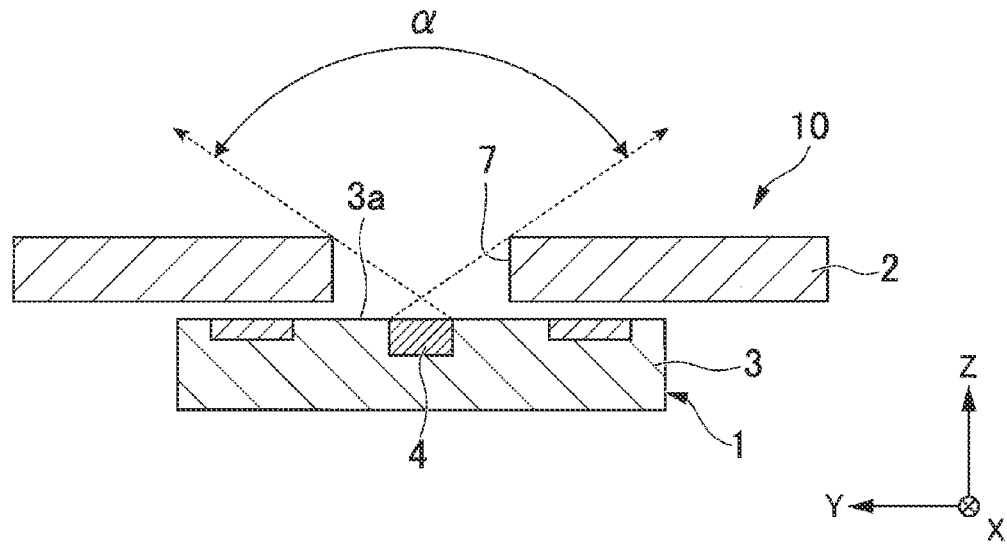
FIG. 3A is a cross-sectional view of an object detecting unit along a line I-I in FIG. 2.
Figure 3B:
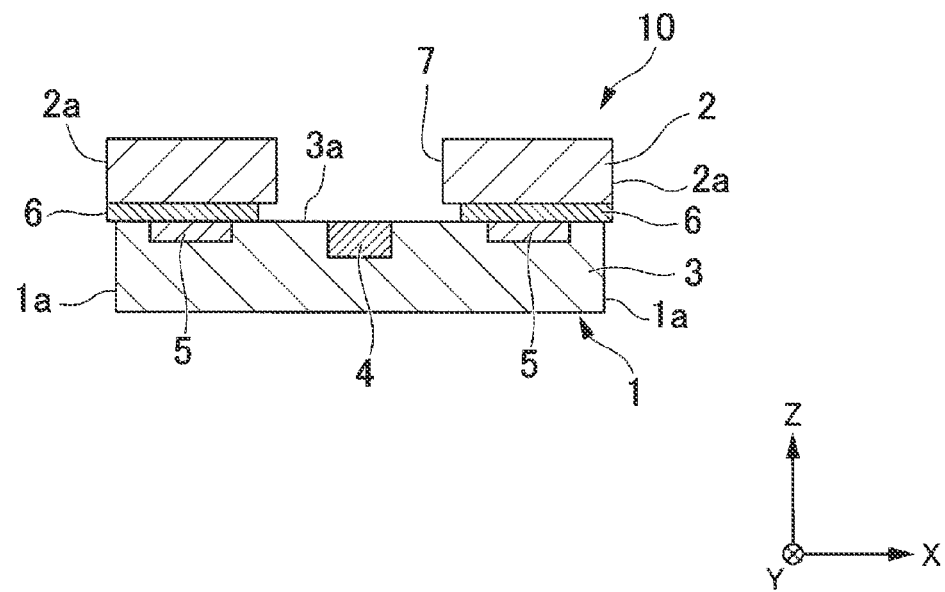
FIG. 3B is a cross-sectional view of the object detecting unit along a line II-II in FIG. 2.
Figure 4:
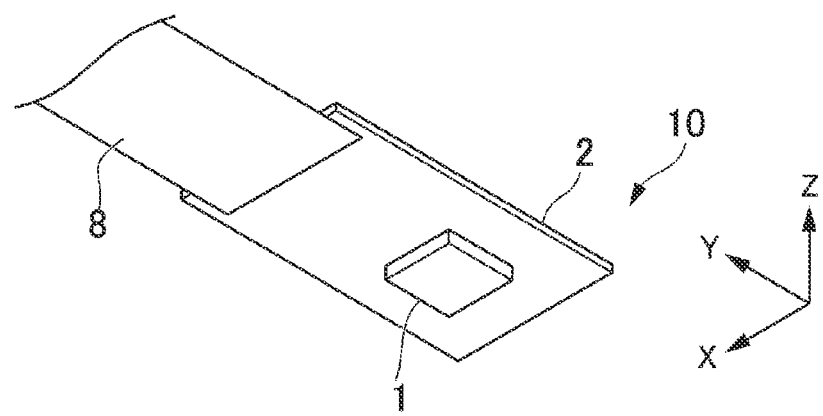
FIG. 4 is a perspective view of the object detecting unit.

FIG. 3A is a cross-sectional view of the object detecting unit 10 along a line I-I in FIG. 2. FIG. 3B is a cross-sectional view of the object detecting unit 10 along a line II-II in FIG. 2. FIG. 4 is a perspective view of the object detecting unit 10.

As shown in FIGS. 3A, 3B, and 4, the object detecting unit 10 includes an object detecting section 1 and a base 2.

As shown in FIGS. 2 and 3B, the object detecting section 1 includes a substrate 3, a detecting element 4, and a plurality of terminals 5.

The substrate 3 has, for example, a rectangular parallelepiped shape (or a rectangular plate-like shape) (see FIG. 4). A thickness direction of the substrate 3 coincides with the Z direction. A surface 3a (a first principal surface 3a) of the substrate 3 is directed to the inward direction (the +Z direction).

As shown in FIG. 2, the first principal surface 3a has a shape of a rectangle having four straight edges 3b to 3e. The first edge 3b and the third edge 3d are along the Y direction. The second edge 3c and the fourth edge 3e are along the X direction.

The detecting element 4 detects a wave (such as infrared rays or ultraviolet rays) coming from an object (such as a person), and outputs a detection signal. The detecting element 4 is provided on the first principal surface 3a of the substrate 3. The detecting element 4 has, for example, a rectangular shape when viewed from a direction parallel to the Z direction. As for the X direction (a top-bottom direction in FIG. 2), the detecting element 4 is located roughly in the center of the first principal surface 3a. That is, the detecting element 4 is located in a position that allows a distance from the first edge 3b and a distance from the third edge 3d to be equal.

The plurality of terminals 5 constitute multiple terminal groups 5A and 5B. Specifically, six terminals 5 constitute two terminal groups 5A and 5B.

Of the terminal groups 5A and 5B, the first terminal group 5A is composed of three terminals 5, 5, 5 aligned in the Y direction. These terminals 5, 5, 5 are arranged at a predetermined interval (i.e., to be equally spaced apart) in the Y direction. The terminals 5, 5, 5 of the first terminal group 5A come close to the first edge 3b of the first principal surface 3a of the substrate 3. Of the terminal groups 5A and 5B, the second terminal group 5B is composed of three terminals 5, 5, 5 aligned in the Y direction. These terminals 5, 5, 5 are arranged at a predetermined interval (i.e., to be equally spaced apart) in the Y direction. The terminals 5, 5, 5 of the second terminal group 5B come close to the third edge 3d of the first principal surface 3a of the substrate 3.

The terminals 5, 5, 5 of the first terminal group 5A and the terminals 5, 5, 5 of the second terminal group 5B are arranged in parallel at an interval in the X direction.

The terminals 5 shown in FIG. 2 are arranged in a 2-by-3 matrix, and the number of the terminals 5 in the Y direction is greater than in the X direction. Therefore, it is possible to enhance the Y-direction position accuracy of the object detecting section 1 with respect to the base 2. This is advantageous in exactly setting a Y-direction detection range α (see FIG. 3A).

As the terminals 5, 5, 5 composing each of the terminal groups 5A and 5B are aligned in the Y direction, the distance between the terminals 5 and a passage hole 7 can be ensured without dependence on a length (a long diameter D1) of the passage hole 7. Therefore, connection of the object detecting section 1 to the base 2 through a connector 6 (see FIG. 3B) is easily ensured.

As shown in FIG. 3B, the terminal 5 is electrically connected to the base 2 through the connector 6 including solder, etc. Accordingly, the object detecting section 1 is mounted on the base 2.

As shown in FIGS. 3A, 3B, and 4, the base 2 is a rigid base using, for example, a glass epoxy material or the like as a base material. A thickness direction of the base 2 coincides with the Z direction. The base 2 is provided to face the first principal surface 3a of the substrate 3. The base 2 is provided on the inward direction (the +Z direction) side against the object detecting section 1. As shown in FIG. 4, the base 2 is connected to a control section, etc. of the display 103 through an FPC 8.

As shown in FIG. 2, side edges 2a, 2a (side edges along the Y direction) of the base 2 come close to side edges 1a, 1a (side edges along the Y direction) of the object detecting section 1 when viewed from a direction (the thickness direction of the base 2) parallel to the Z direction. Therefore, it is possible to reduce the size of the object detecting unit 10.

To arrange so that the side edges 2a, 2a of the base 2 and the side edges 1a, 1a of the object detecting section 1 are brought close to each other, for example, the following technique can be used. Prepare a base (illustration omitted) having a wider width (X-direction dimension) than the object detecting section 1, and reflow solder provided between this base and the object detecting section 1. After that, cut off the side edge of the base to reduce the width dimension; thus, the object detecting unit 10 in which the respective side edges of the base 2 and the object detecting section 1 come close to each other is obtained. According to this technique, despite the fact that the width of the base 2 is narrow, it is possible to ensure the secure connection of the object detecting section 1 to the base 2.

As shown in FIGS. 2, 3A, and 3B, the passage hole 7 is formed on the base 2. The passage hole 7 is formed to penetrate through the base 2 in the thickness direction. The passage hole 7 allows a wave (such as infrared rays) coming from an object (such as a person) to pass therethrough toward the detecting element 4.

As shown in FIG. 2, the passage hole 7 is formed into a long hole whose longer direction is along the Y direction when viewed from a direction parallel to the Z direction. The passage hole 7 has, for example, an oval shape.

The periphery of the passage hole 7 has two straight side edges 7a, 7a and two curved convex end edges 7b, 7b. The two side edges 7a, 7a are parallel to each other, and are located facing each other. The side edges 7a, 7a are straight along the Y direction. The end edges 7b, 7b have a curved convex shape bulging in a direction away from each other. The end edges 7b, 7b have, for example, a semicircular shape (an arc shape), an elliptic arc shape, or the like. As the side edges 7a, 7a are straight along the Y direction, the passage hole 7 can be called a long hole whose longer direction is along the Y direction. The oval passage hole 7 can be formed with use of a general-purpose punching tool, and therefore has the advantage that it can be easily formed.

The longer direction (the Y direction) of the passage hole 7 does not have to be a direction along the exactly horizontal direction. The longer direction of the passage hole 7 only has to be a direction along a substantially horizontal direction. The substantially horizontal direction includes a direction inclined in a range of ±15° to the horizontal direction.

The long diameter D1 of the passage hole 7 is greater than a short diameter D2. A diameter ratio D1/D2 can be, for example, equal to or more than 1.4. If the diameter ratio D1/D2 is equal to or more than 1.4, a horizontal-direction detection range (the detection range α shown in FIGS. 3A and 6) of the object detecting section 1 can be enlarged without increasing the opening area. The diameter ratio D1/D2 can be, for example, equal to or less than 2.5. If the diameter ratio D1/D2 is equal to or less than 2.5, it is possible to prevent a top-bottom-direction detection range (a detection range β shown in FIG. 5) of the object detecting section 1 from being excessively small.

Figure 6:
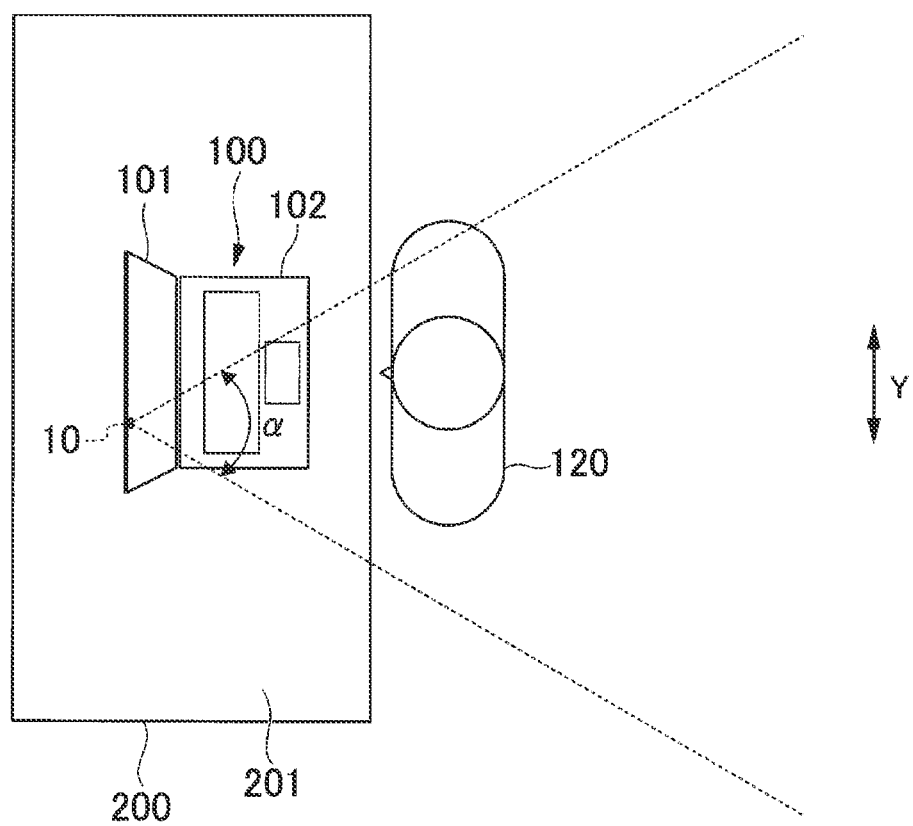
FIG. 6 is a plan view showing the example of the form of usage of the electronic apparatus according to the embodiment.

As shown in FIGS. 3A and 6, the horizontal-direction detection range α of the object detecting section 1 can be, for example, 30° to 120°. If the detection range α is equal to or more than 30°, it is possible to increase the performance of detecting a user. If the detection range α is equal to or less than 120°, it is possible to reduce false detection.

The position and size of the passage hole 7 are set so as to contain the detecting element 4 when viewed from a direction parallel to the Z direction. The long diameter D1 of the passage hole 7 is greater than a Y-direction dimension of the detecting element 4. The short diameter D2 of the passage hole 7 is greater than an X-direction dimension of the detecting element 4. In the example shown in FIG. 2, the center (the median point) of the oval passage hole 7 coincides with the center (the median point) of the rectangular detecting element 4.

The position of the passage hole 7 in the X direction (the second direction, the top-bottom direction in FIG. 2) is between the first terminal group 5A and the second terminal group 5B. Specifically, in FIG. 2, the passage hole 7 is in a lower position than the first terminal group 5A and in a higher position than the second terminal group 5B.

As shown in FIGS. 1 and 2, the position of the object detecting unit 10 in the right-left direction (the Y direction) in the first chassis 101 is in a position that deviates from the Y-direction center. Specifically, the object detecting unit 10 is located nearer to the left direction (the +Y direction) than the Y-direction center.

The imaging unit 20 is provided inside the first chassis 101 and between the front end 103b of the display area 103a of the display 103 and the first open end 101a. The imaging unit 20 is provided in a position corresponding to the front bezel 114A when viewed from a direction parallel to the Z direction. The position of the imaging unit 20 in the right-left direction is, for example, the center.

The imaging unit 20 is, for example, a camera having an imaging device. The imaging unit 20 may be an infrared camera, or may be a general camera. The infrared camera is a camera including an infrared sensor as an imaging device. The general camera is a camera including a visible-light sensor that receives visible rays as an imaging device.

[Detection of Object by Object Detecting Unit]

Subsequently, detection of an object by the object detecting unit 10 is described.

Figure 5:
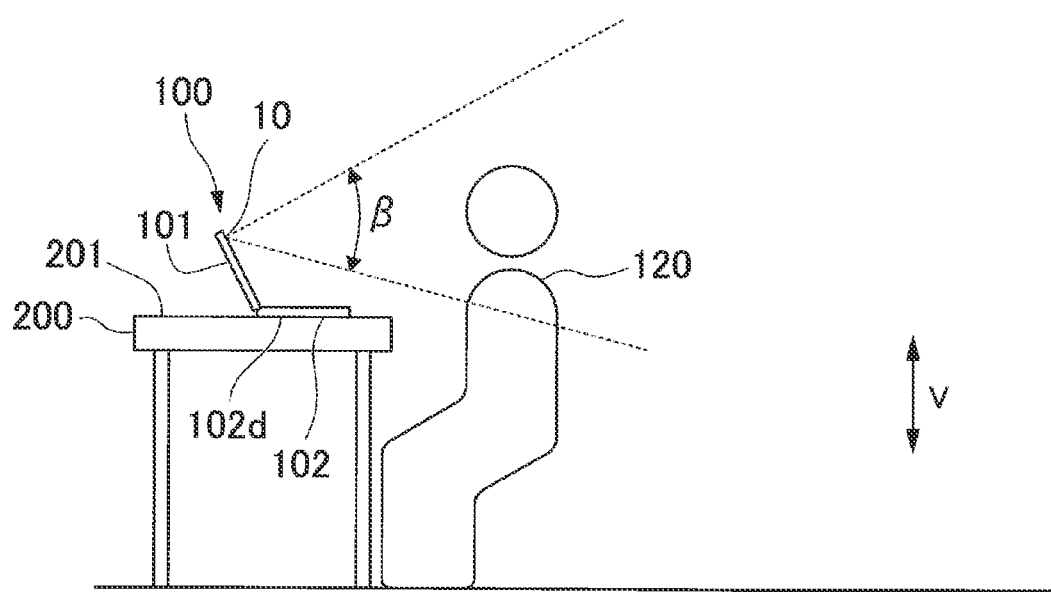
FIG. 5 is a side view showing an example of the form of usage of the electronic apparatus according to the embodiment.

FIG. 5 is a side view showing an example of the form of usage of the electronic apparatus 100. FIG. 6 is a plan view showing the example of the form of usage of the electronic apparatus 100. In the following, it is assumed that a user 120 sitting on a chair (illustration omitted) operates the electronic apparatus 100 placed on a horizontal installation surface 201 of a desk 200 as shown in FIGS. 5 and 6.

As the installation surface 201 is a horizontal surface, as described above, the first chassis 101 adopts the reference posture. Therefore, as shown in FIG. 2, the longer direction of the passage hole 7 of the object detecting unit 10 is along the horizontal direction (the Y direction). The passage hole 7 is horizontally long, and thus the horizontal-direction detection range α (see FIG. 6) of the object detecting section 1 is larger as compared with a case of a circular passage hole having an equal diameter to the short diameter D2.

As shown in FIG. 5, as for the top-bottom direction (the vertical direction V), it is less likely for the user 120 to move to a great extent. Therefore, the user 120 being out of the top-bottom-direction detection range β is unlikely to become a problem.

As shown in FIG. 6, the user 120 can easily move to a lateral direction (the Y direction) with respect to the desk 200, and thus a relative position of the user 120 to the electronic apparatus 100 is likely to change to the Y direction.

In the electronic apparatus 100, the horizontal-direction detection range α of the object detecting section 1 is large; therefore, even in a case where the relative position of the user 120 to the electronic apparatus 100 has changed to the lateral direction (the Y direction), presence of the user 120 is easily detected.

As the passage hole 7 of the object detecting unit 10 is a long hole, the opening area can be reduced as compared with a circular passage hole having an equal diameter to the long diameter D1 (see FIG. 2). Therefore, effective area of the base 2 can be ensured to a great extent. Accordingly, it is possible to reduce the size of the object detecting unit 10. Furthermore, the opening area of the passage hole 7 can be reduced, and thus the distance between the terminals and the passage hole 7 can be ensured sufficiently. Therefore, the connection of the object detecting section 1 to the base 2 through the connector 6 (see FIG. 3B) can be easily ensured.

Modification Example

Figure 7:
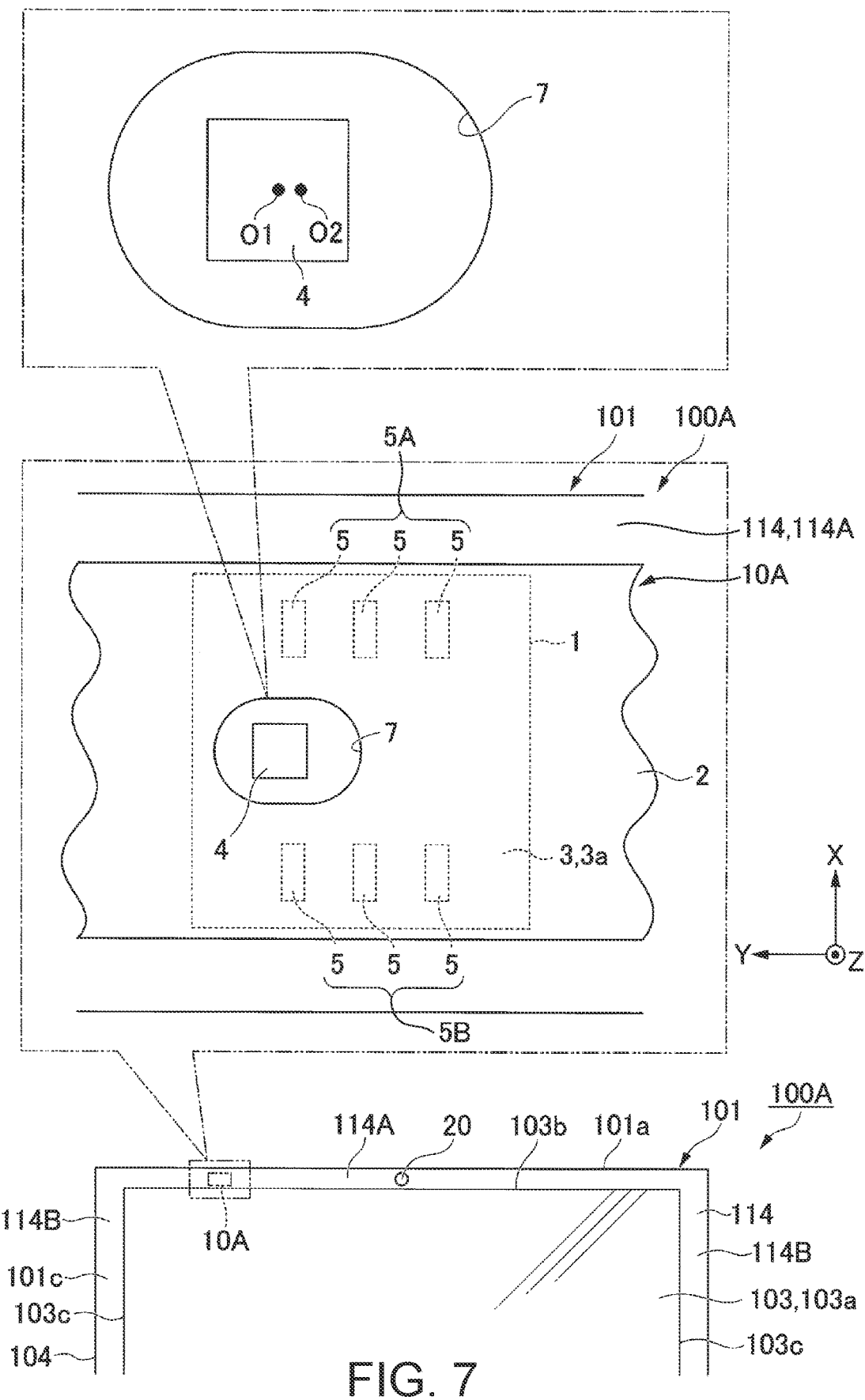
FIG. 7 is a front view of a portion of an electronic apparatus including an object detecting unit according to a modification example.

FIG. 7 is a front view of a portion of an electronic apparatus 100A including an object detecting unit 10A according to a modification example.

The electronic apparatus 100A differs from the electronic apparatus 100 shown in FIG. 2 in the way that a center (a median point) O2 of the passage hole 7 is located nearer to the Y-direction center (nearer to the −Y direction) than a center (a median point) O1 of the detecting element 4 when viewed from a direction parallel to the Z direction.

In the electronic apparatus 100A, the passage hole 7 is formed nearer to the Y-direction center (nearer to the −Y direction). Therefore, despite the fact that the object detecting unit 10A is located nearer to the +Y direction than the center with respect to the first chassis 101, it is possible to suppress the detection range of the object detecting section 1 from tending toward the +Y direction.

In the foregoing, the embodiment of the present invention is described in detail with reference to the drawings; however, a specific configuration is not limited to the above-described embodiment, and includes the design, etc. without departing from the scope of the invention. The components described in the foregoing embodiment can be combined arbitrarily.

For example, a wave to be detected by an object detecting section may be an electromagnetic wave such as a radio wave having a shorter wavelength than infrared rays as well as an elastic wave such as a sound wave or an ultrasonic wave. The object detecting section may be a sensor using another method, such as a sensor using an ultra-wideband (UWB) radar, as long as it is a sensor that detects a distance from an object. The object detecting section may be configured to be able to detect whether or not it is in a state where an object to be detected has come nearer and then remained within a predetermined range of distance from an electronic apparatus for a given length of time on the basis of the strength of a detection signal.

The object detecting section 1 shown in FIG. 3A, etc. is a passive object detector (sensor) having no emitter (no wave source); however, the object detecting section may be an active type equipped with an emitter (a wave source) and a receiver (a detecting element). The active object detecting section may be, for example, a laser sensor module. In this case, the emitter is, for example, a laser light source that emits laser light (a wave). As the laser light source, for example, an infrared laser, a visible light laser, or the like can be used. Infrared rays are not limited to laser light, and may be infrared rays that a light-emitting diode emits. In the active object detecting section, the receiver can detect a wave (a reflected wave) that a wave (such as infrared laser light) emitted from the emitter has been reflected by the surface of an object (such as a person).

The shape of the passage hole 7 shown in FIG. 2 is an oval shape; however, as long as it is a long hole (a shape of which the longer side dimension is greater than the shorter side dimension), the passage hole may have, for example, a rectangular shape, a diamond shape, an elliptical shape, etc.

In the electronic apparatus 100 shown in FIG. 1, etc., the object detecting unit 10 is provided on the front bezel 114A; however, an object detecting unit may be provided on a rear bezel.

The object detecting section 1 shown in FIG. 2 includes the two terminal groups 5A and 5B; however, the number of terminal groups is not limited to two, and may be one, or may be any number greater than or equal to three. In a case where the number of terminal groups is three or more, the X-direction position of the passage hole may be between, of the multiple terminal groups, at least two terminal groups. The number of terminals composing each terminal group is not limited to three, and may be two, or may be any number greater than or equal to four.

The installation surface 201 shown in FIG. 1 does not have to be exactly horizontal. An installation surface may be inclined in a range of ±15° to the horizontal surface.

The invention claimed is:

1. An electronic apparatus comprising:
a base;
an object detecting section that includes at least a substrate and a detecting element on a first principal surface of the substrate and is configured to detect a wave coming from an object and to output a detection signal, the object detecting section being mounted on the base with the first principal surface facing the base; and
a chassis that houses the base and the object detecting section,
wherein the base has a passage hole that allows the wave to pass through the passage hole toward the detecting element,
a long direction of the passage hole is along a first direction that is a substantially horizontal direction when the chassis adopts a reference posture,
the first principal surface has a plurality of terminals that are electrically connected to the base,
the plurality of terminals constitute at least two terminal groups,
the terminal groups are each composed of multiple terminals aligned in the first direction,
the at least two terminal groups are arranged in parallel at an interval in a second direction intersecting with the first direction, and
a position of the passage hole in the second direction is between the at least two terminal groups.

2. The electronic apparatus according to claim 1, wherein a side edge of the base along the first direction is close to a side edge of the object detecting section when viewed from a direction parallel to a thickness direction of the base.

3. The electronic apparatus according to claim 1, wherein the passage hole has an oval shape.

4. An electronic apparatus comprising:

a base;

an object detecting section that includes at least a substrate and a detecting element on a first principal surface of the substrate and is configured to detect a wave coming from an object and to output a detection signal, the object detecting section being mounted on the base with the first principal surface facing the base; and a chassis that houses the base and the object detecting section, wherein the base has a passage hole that allows the wave to pass through the passage hole toward the detecting element, a long direction of the passage hole is along a first direction that is a substantially horizontal direction when the chassis adopts a reference posture, the object detecting section is in a position that deviates from a center of the chassis in the first direction, and when viewed from the thickness direction of the base, a center of the passage hole is located closer to a center in the first direction than a center of the detecting element.

* * * * *